United States Patent [19]

Bowser

[11] 4,252,877
[45] Feb. 24, 1981

[54] BATTERY ELECTRODE

[75] Inventor: Roger J. Bowser, Huntingdon, England

[73] Assignee: Johnson, Matthey & Co., Limited, London, England

[21] Appl. No.: 969,825

[22] Filed: Dec. 15, 1978

[30] Foreign Application Priority Data

Dec. 29, 1977 [GB] United Kingdom ............... 54128/77

[51] Int. Cl.³ ............................................. H01M 4/34
[52] U.S. Cl. .................................... 429/212; 429/219
[58] Field of Search ................ 429/219, 212, 214–217, 429/232

[56] References Cited

U.S. PATENT DOCUMENTS

| | | | |
|---|---|---|---|
| 2,962,540 | 11/1960 | Kordesch | 429/232 |
| 3,356,537 | 12/1967 | Duddy | 429/219 |
| 3,466,195 | 9/1969 | Spellman et al. | 429/219 X |

*Primary Examiner*—Anthony Skapars
*Attorney, Agent, or Firm*—Cushman, Darby & Cushman

[57] ABSTRACT

This invention relates to batteries and to materials for use therein, and in particular to batteries of the type which utilize silver positive electrodes and alkaline electrolytes.

Specifically a battery electrode comprises silver (II) oxide and carries at least on a portion of its surface a layer or coating or deposit of an organosilicon compound.

A composition of matter suitable for use in battery electrodes comprises a compound having the formula $R^1R^2R^3SiOH$, in which $R^1$, $R^2$ and $R^3$ are the same or different and are selected from alkyl, aryl, alkaryl and aralkyl groups and substituted derivatives thereof.

10 Claims, No Drawings

BATTERY ELECTRODE

This invention relates to batteries and to materials for use therein, and in particular to batteries of the type which utilise silver positive electrodes and alkaline electrolytes.

Silver is commonly used as a positive electrode material in certain types of primary and secondary batteries, generally either as silver (I) oxide or as a silver (II) oxide. A well-known disadvantage associated with the use of silver (II) oxide, however, is that, in contact with aqueous solutions of alkaline electrolytes, it evolves oxygen and this evolution militates against the use of an hermetically sealed battery casing since pressure build-up, with consequent risk of explosion, occurs as a result with the casing. Since it is desirable, for a number of reasons, to seal hermetically certain types of battery, attention has in the past been focussed on means to reduce this so-called "gassing" of silver (II) oxide. One method that has been proposed, for example, is to add, either to the electrolyte or to the silver electrode itself, a heteropolar compound such as anisaldehyde or n-decanol, one end of such a molecule being able to attach itself to the surface of the silver oxide particles and the other end of the molecule being hydrophobic in nature, the effect being to hinder direct contact of the electrode with the electrolyte. The disadvantage of using such compound is that they tend to become oxidised with the result that they gradually lose their effectiveness as anti-gassing agents; they also reduce the silver (II) oxide thus lowering battery capacity.

Accordingly, it is an object of the present invention to provide an improved form of silver (II) oxide for use in battery electrodes and which reduces gassing and is resistant to oxidation.

It is a further object of the present invention to provide an additive for a battery or a battery positive electrode and which does not suffer from the disadvantages, referred to above, of prior art additives.

According to a first aspect of the invention, a battery electrode comprises silver (II) oxide and carries at least on a portion of its surface a layer or coating or deposit of an organosilicon compound.

Preferably, the organosilicon compound has the formula $R^1R^2R^3SiOH$, in which $R^1$, $R^2$ and $R^3$ are the same or different and are selected from alkyl, aryl, alkaryl and aralkyl groups and substituted derivatives thereof.

According to a second aspect of the invention, a composition of matter suitable for use in battery electrodes as hereinbefore defined comprises particles of silver (II) oxide, said particles having on at least a portion of their surface a coating or deposit of an organosilicon compound.

The organosilicon compound according to the second aspect of the invention comprises either a compound of formula $R^1R^2R^3SiOH$ or a precursor compound which will yield, on hydrolysis under the conditions obtaining in a battery of the types described—that is to say, in contat with alkaline electrolytes—a compound of formula $R^1R^2R^3SiOH$.

Suitable precursor compounds may be selected from, for example, compounds having the general formula $R^1R^2R^3Si-X$ where X is halogen or pseudohalogen, compounds having a Si-S linkage, for example $R^1R^2R^3Si-SH$, compounds having an Si-N linkage, for example $R^1R^2R^3Si-NH_2$, and compounds having an Si-OR linkage, for example $R^1R^2R^3Si-OEt$.

We have found that a suitable organosilicon compound for use in either aspect of the invention is triphenylsilanol, whereby all the R groups in the general formula above are phenyl groups. We have, however, considered various other compounds of silicon, as a result of which we believe that it is desirable, from the point of view of stability, to have relatively bulky R groups and also to lessen the acidity of the hydrogen atom on the hydroxy group. To this end, it is useful, where one or more of the R groups is phenyl, to have electrondonating groups substituted on one or more of the phenyl groups in the ortho- and/or para-positions. One such suitable alternative compound is diphenyltoluylsilanol. Additionally, we have investigated the use of organo-silicon compounds containing two or more hydroxy groups but these compounds do not show particular advantages over the mono-hydroxy compounds.

Preferably, the organosilicon compound is coated or deposited on the silver (II) oxide particles, or on at least the surface of a battery electrode, in an amount of from about 0.001 g–0.2 g, preferably 0.002–0.008 g, per gram of silver metal. Amounts substantially above 0.2 g per gram of silver have an adverse effect on the functioning of the battery due to a corresponding reduction in electrode capacity and amounts substantially below 0.001 g per gram of silver are simply not effective in covering the surface of the silver (II) oxide or of the electrode and hence in reducing gassing.

We prefer to add the coating or deposit of organo-silicon compound directly to the particulate silver (II) oxide during or after its preparation, although it would be possible to add it either to the manufactured electrode or to the electrolyte. The silver (II) oxide is first typically prepared in the standard way by the alkaline oxidation of silver nitrate and is afterwards submitted to one or more water-washes. The silver (II) oxide is then coated or deposited with the organosilicon compound either by pouring a solution of the compound in an organic solvent which is also water miscible, for example acetone, into water which contains, or to which may be added, the silver (II) oxide, and stirring the silver (II) oxide with the resulting aqueous suspension of organosilicon compound, or by washing the particulate silver (II) oxide with a solution of the organo silicon compound, in, for example, acetone.

The silver (II) oxide particles may be tested for gassing in a variety of ways, but one of the methods used is as follows:

A 2.0 g of silver (II) oxide is placed in each of three gassing rate bottle (25 ml specific gravity type) and electrolyte comprising 38 wt.% NaOH, 4.0 wt.% ZnO and 1.0 wt.% (max) $Na_2CO$- is added to each bottle to cover the silver (II) oxide. The bottles are then placed for 10 min. in a vacuum dessicator and vibrated to degas the contents before being filled with light paraffin oil (S.G. 0.870–0.890) and immersed in an oil bath maintained at 50° C. and fitted with a vibrating support plate. Three 25 ml graduated gas collecting tubes are also filled with light paraffin oil and inserted in the oil bath and approximately 1 ml of air is allowed to enter each tube. A tube is then clamped upright over each bottle with the neck fitting loosely inside the tube. After the temperature has been allowed to equilibrate, the initial gas volume is taken, the oil bath vibrator is switched on and run continuously at maximum vibration. Readings of gas volume are taken every 24 hours for 600 hours and gassing rates calculated as $\mu l\ g^{-1}\ hr^{-1}$.

We have found, using the technique above, that gassing rates for silver (II) oxide carrying a coating or deposit of triphenylsilanol are roughly half those for silver (II) oxide without any additive, and are usually in the range 2.0–3.0 $\mu l$ $g^{-1}$ $hr^{-1}$.

I claim:

1. A battery electrode comprising silver (II) oxide and carrying at least on a portion of its surface a layer, coating or deposit of an organosilicon compound of the formula $R^1R^2R^3SiOH$ in which $R^1$, $R^2$ and $R^3$ are the same or different and are selected from the group consisting of unsubstituted aryl and aryl carrying one or more electron-donating groups in the ortho- and/or para-positions.

2. A composition of matter suitable for use in a battery electrode comprising particles of silver (II) oxide, said particles having on at least a portion of their surface a coating or deposit of an organosilicon compound of the formula $R^1R^2R^3SiOH$ in which $R^1$, $R^2$ and $R^3$ are the same or different and are selected from the group consisting of unsubstituted aryl and aryl carrying one or more electron-donating groups in the ortho- and/or para-positions.

3. A composition according to claim 2 wherein the said compound is obtained from a precursor compound which on hydrolysis in an alkaline electrolyte yields the compound of formula $R^1R^2R^3SiOH$.

4. A composition according to claim 3 wherein the precursor compound has
   the general formula $R^1R^2R^3Si-X$ where X is halogen or pseudohalogen; SH; $NH_2$ or OET.

5. A composition according to claim 2 wherein the organosilicon compound is a tri-phenylsilanol in which $R^1$, $R^2$ and $R^3$ are substituted or unsubstituted phenyl groups.

6. A composition according to claim 5 wherein at least one phenyl group has an electron donating group substituted in the ortho- and/or para positions.

7. A battery electrode according to claim 1 wherein the organosilicon compound is coated or deposited on the silver (II) oxide in an amount of between 0.001 g to 0.2 g per gram of silver metal.

8. A battery electrode according to claim 7 wherein the amount of organosilicon compound is between 0.002 to 0.008 g. per gram of silver metal.

9. A composition according to claim 2 wherein the organosilicon compound is triphenylsilanol of diphenyltoluylsilanol.

10. A battery electrode according to claim 1 wherein the organosilicon compound is triphenylsilanol or diphenyltoluylsilanol.

* * * * *